(12) United States Patent
Apvrille

(10) Patent No.: US 10,178,130 B2
(45) Date of Patent: Jan. 8, 2019

(54) AUGMENTED REALITY VISUALIZATION DEVICE FOR NETWORK SECURITY

(71) Applicant: Fortinet, Inc., Sunnyvale, CA (US)

(72) Inventor: Axelle Apvrille, Biot (FR)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/265,344

(22) Filed: Sep. 14, 2016

(65) Prior Publication Data

US 2018/0077200 A1  Mar. 15, 2018

(51) Int. Cl.
| | |
|---|---|
| H04L 29/06 | (2006.01) |
| G06T 19/00 | (2011.01) |
| G02B 27/01 | (2006.01) |
| G06T 11/60 | (2006.01) |

(52) U.S. Cl.
CPC .......... *H04L 63/20* (2013.01); *G02B 27/0172* (2013.01); *G06T 11/60* (2013.01); *G06T 19/006* (2013.01); *H04L 63/1416* (2013.01); *G02B 2027/014* (2013.01); *G02B 2027/0138* (2013.01); *G02B 2027/0141* (2013.01)

(58) Field of Classification Search
CPC ... H04L 63/1416; H04L 63/20; G06T 19/006; G02B 27/0172; G02B 2027/0141; G02B 2027/0138; G02B 2027/014
See application file for complete search history.

(56) References Cited

U.S. PATENT DOCUMENTS

| | | | |
|---|---|---|---|
| 6,906,709 B1 * | 6/2005 | Larkin | H04L 63/1433 345/419 |
| 8,782,265 B1 * | 7/2014 | Bokotey | H04L 41/22 709/203 |
| 9,069,166 B2 | 6/2015 | Abdollahi et al. | |
| 9,367,950 B1 * | 6/2016 | Scranton | G06T 15/10 |
| 2003/0110393 A1 * | 6/2003 | Brock | G06F 21/554 726/23 |
| 2012/0249588 A1 | 10/2012 | Tison et al. | |
| 2014/0085335 A1 * | 3/2014 | Chen | G09G 5/00 345/633 |
| 2016/0212172 A1 * | 7/2016 | Senanayake | H04L 63/20 |
| 2016/0337204 A1 * | 11/2016 | Dubey | H04L 41/22 |
| 2017/0070594 A1 * | 3/2017 | Oetting | H04L 67/32 |

OTHER PUBLICATIONS

Templeton, G., F-35 helmet uses retinal projection to give pilots a "God's eye view" Feb. 25, 2015. 13 pgs.
Naugle, E., "Tech spotlight: Jet's Glance Detection Technology." Aug. 31, 2015. 2 pgs.

* cited by examiner

*Primary Examiner* — Robert B Leung
*Assistant Examiner* — Thomas Ho
(74) *Attorney, Agent, or Firm* — Hamilton, DeSanctis & Cha LLP

(57) ABSTRACT

Systems and methods for managing network security events with the assistance of augmented reality are provided. According to one embodiment, a reality image of a network object is captured by an augmented reality device. The network object is identified from the reality image by the augmented reality device. Dynamic network security information is received by the augmented reality device from a network security appliance associated with a network that is managing the network object. An augmented overlay image is generated by the augmented reality device based on the reality image and the dynamic network security information. The augmented overlay image is displayed by the augmented reality device.

24 Claims, 5 Drawing Sheets

AUGMENTED REALITY VISUALIZATION DEVICE FOR NETWORK SECURITY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of network security techniques. In particular, various embodiments relate to augmented reality devices and methods for managing network security events.

Description of the Related Art

A large network of a corporation or a data center may comprise hundreds or thousands of network devices. Usually, a facility room is dedicated for placement of servers, routers, hubs and network security appliances, while other utility devices, such as personal computers, laptops, printers, access points, surveillance cameras and other network devices, deployed outside the facility room are connected to routers, the network security appliances and servers through network cables. Usually, network administrators manage the network security appliances through terminal devices that are out of the facility room. The terminal devices are connected to the network security appliances by a local area network (LAN) or wide area network (WAN). Network administrators may configure the network security appliances and monitor operations of the network security appliances remotely. However, the network administrators may also need to go into the facility room and conduct some manual operations with respect to the routers and network security appliances, such as connecting a network cable to a port of a firewall or disconnecting it from the port. However, as hundreds or thousands of cables may be gathered at the facility room and each one of cables is connected to a port of the network security appliances, it may be hard for the administrators to identify the right cable or network security appliance among the large number of cables and network security appliances. An augmented reality device may help in finding out the deployments and configurations of network devices as described in US Pub. No. US 2012/0249588, which is incorporated by reference herein in its entirety for all purposes. However, there is a need for managing network security events with augmented reality devices.

SUMMARY

Systems and methods are described for managing network security events with the assistance of augmented reality. According to one embodiment, a reality image of a network object is captured by an augmented reality device. The network object is identified from the reality image by the augmented reality device. Dynamic network security information is received by the augmented reality device from a network security appliance associated with a network that is managing the network object. An augmented overlay image is generated by the augmented reality device based on the reality image and the dynamic network security information. The augmented overlay image is displayed by the augmented reality device.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
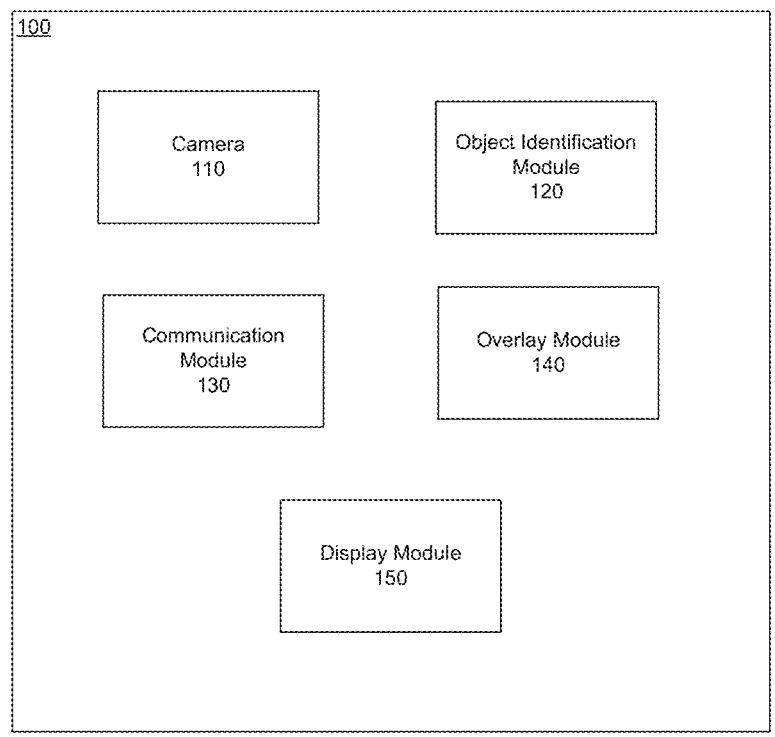
FIG. 1 is a block diagram illustrating an exemplary augmented reality device in which embodiments of the present invention may be employed.

Systems and methods are described for managing network security events with the assistance of augmented reality. According to one embodiment, an augmented reality device captures a reality image of a network object and identifies the network object from the reality image. The augmented reality device retrieves dynamic network security information associated with the network object from a network security appliance that is managing or otherwise connected to the network object and generates an augmented overlay image from the dynamic network security information retrieved from the network security appliance. The augmented overlay image of the network object and the dynamic network security information are displayed on the augmented reality device.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "security device" generally refers to a hardware device or appliance configured to be coupled to a network and to provide one or more of data privacy protection, integrity, authenticity, encryption and security. The network security appliance can be a device providing one or more of the following features: network firewalling, Virtual Private Networking (VPN), antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security appliances include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, VPN, IP security (IPSec), Secure Sockets Layer (SSL), antivirus, intrusion detection, intrusion prevention, Web content filtering, spyware prevention and antispam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "network object" generally refers to a uniquely identifiable physical component, part, piece, assembly, subassembly, system or subsystem of a network device (e.g., a security device, a network appliance, a personal computer, a laptop, a mobile device, an access point, a network controlled camera or a server) or the entirety of the network device. Non-limiting examples of network objects include a physical port of a network device, a processing resource of the network device (e.g., a network processor, a content processor, an ASIC or the like), a network interface of a network device, an Ethernet cable, a standalone network device or any other physical objects connected to, managed by or otherwise associated with a public or private network or a network device.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 is a block diagram illustrating an exemplary augmented reality device 100 in which embodiments of the present invention may be employed. In the present example, augmented reality device 100 may be a dedicated head mounted augmented reality goggle or glasses, a head up display (HUD) system or a mobile device, such as a smart phone or a tablet computer. Augmented reality device 100 may include a camera module 110, an object identification module 120, a communication module 130, an overlay module 140 and a display module 150.

Camera module 110 is used for capturing reality images of physical objects, including network objects. The images may be live images or live video of the physical objects. In one example, the physical objects may include network devices, such as firewalls, routers, hubs and access point controllers. In another example, the physical objects may include particular components, such as a port, a cable and/or a network interface of a network device.

Object identification module 120 is used for identifying one or more network objects in the reality images. As used herein a network object generally refers to a physical component that may be connected to a network or a network device. A network object may be a complete device that can be used by users, such as a personal computer, a laptop, a mobile device, an access point, a network controlled camera, a server or a firewall. A network object may be a component or a part of a network device that may be used for connecting the network device to a network, such as a cable, a port, or a network interface. Network objects in the captured image may be identified by augmented reality device 100 itself when augmented reality device 100 is in standalone mode. In standalone mode, augmented reality device 100 may analyze the image or a portion of the image indicated by the user and detect the colors, lines, borders and shapes of objects and identify various network objects, e.g., a firewall, a router, or a cable, contained within the image that are connected to a particular network security appliance, for example, or a port of a particular network security appliance, for example, based on optical object recognition techniques.

Augmented reality device 100 may also operate in a connected mode and identify network objects in the reality images with input from one or more network security appliances. In the connected mode, augmented reality device 100 may establish a connection with a network security appliance, such as a FORTIGATE network security appliance available from the assignee of the present invention, through communication module 130. In one example, communication module 130 is a Bluetooth module and augmented reality device 100 may pair with the network security appliance to establish a peer-to-peer communication with the network security appliance. In another example, communication module 130 may be wireless network interface and a network connection may be established between augmented reality device 100 and the network security appliance. The user of augmented reality device 100 may be authenticated and a secure tunnel may be established between augmented reality device 100 and the network security appliance in order that data may be securely exchanged by various means such as a web interface or other protocols (e.g. Simple Network Management Protocol (SNMP), telnet, or Secure Shell (SSH)). Those skilled in the art will appreciate that a variety of other communication protocols, such as Zigbee, Bluetooth Low Energy, Z-Wave or other short range wireless communication technologies can be used by communication module 130.

In one example, the current location of augmented reality device 100 may be captured by a global positioning system (GPS) or similar positioning module of augmented reality device 100. The current location of augmented reality device 100 may be sent to the network security appliance through communication module 130. The current network security information of the network objects at the current location may be retrieved from the network security appliance by augmented reality device 100.

In another example, a network object, such as a firewall, a router or a hub may be identified based on an attached sticker or label having a barcode/quick response (QR) code. The barcode or QR code may contains the media access control (MAC) address of the network object or an identifier, such as a device name or a serial number, that is assigned to the network object within the private network. The user of augmented reality device 100 may focus camera 110 on the sticker and a barcode/QR code reader module may decode the MAC address or identification of the network object from the barcode/QR code. The MAC address or identification of the network may be sent to the network security appliance through communication module 130 and security information of the network object may be retrieved by augmented reality device 100.

In a further example, a network object, such as a port of a firewall or a cable that is connected to (or should be connected to) network security appliance, may be identified by eye tracking that is used in combat aircraft for pilots to select their target as described in http://www.geek.com/chips/f-35-helmet-uses-retinal-projection-to-give-pilots-a-gods-eye-view-1616488 or similar technologies, e.g. Recon Jet with Glance Detection http://www.reconinstruments.com/2015/08/tech-spotlightjets-glance-detection-technology (as described in U.S. Pat. No. 9,069,166), all of which are hereby incorporated by reference in their entirety for all purposes. Similarly, a network object may be identified from the reality images by voice control. The user of augmented reality device 100 may indicate where the network object of interest is located within the image by giving orders such as left, right, up and down. Alternatively, a network object may be identified through a trackpad or buttons on augmented reality device 100. The user of augmented reality device 100 may indicate where the network object is located in the image using the trackpad or buttons. By analyzing the image or a portion of image indicated by the user, a network object, such a cable or a port, may be identified using optical object recognition techniques based on colors, lines, borders and shapes of the network object. Auxiliary text information, e.g., a port number, a device model name and a device serial number, that is useful for identifying the network object may also be identified from the image by, for example, optical character recognition (OCR) technologies.

Information regarding the network object identified by augmented reality device 100, e.g., location, port number, model name or serial number, may be sent to the network security appliance through communication module 130. The network security appliance may maintain an inventory database that registers hardware and software configurations including position information of network objects managed by or connected to the network security appliance. The network security appliance may look up a network object based on the location of augmented reality device 100 or the identification information of the network object from the inventory database. Then, dynamic security information associated with the network objects may be retrieved and returned to augmented reality device 100. The dynamic network security information may include, but are not limited to, network policies controlling the network object, network traffic going through the network object, network sessions going through the network object, applications running on the network object and security or network events occurring on, within or through the network object, e.g., lost connectivity or under threat by outside attacks. The dynamic network security information may also include warning messages about dangerous security events and suggested operations to address the dangerous security events. The network security appliance retrieves security information associated with the network object and returns it back to augmented reality device 100.

Overlay module 140 is used for generating an augmented image by overlaying the dynamic network security information to the image of physical objects. For example, an intrusion to a network device may be detected by the network security appliance, the intrusion information retrieved from the network security appliance may be overlaid on top of the image of the network device that is being attacked, or the cable or the port that connected to the network device. A warning message or a suggested operation, such as disconnect the cable, may also be overlaid on the image of the network device, the port or cable. The cable or port that connected to the network device may be highlighted in the reality image.

Display module 150 is used for displaying the augmented image to the user. In some examples, display module 150 is an optical head-mounted display (OHMD) or HUD display that may reflect projected images as well as allow the user to see through it. The dynamic network security information may be projected as a 2D or 3D object on the OHMD or user's eye and then the user sees an augmented overlay image of the virtual object and the reality image. In some other examples, display module 150 is a display panel, for example, a Liquid Crystal Display (LCD), light emitting diode (LED) display, organic light emitting diode (OLED) display, plasma display panel (PDP), cathode ray tube (CRT), and the like. Dynamic network security information may be mixed on top of the reality image of the network object to generate a mixed augmented image. An augmented image showing the network object and the dynamic network security information is display on display module 150.

Figure 2:
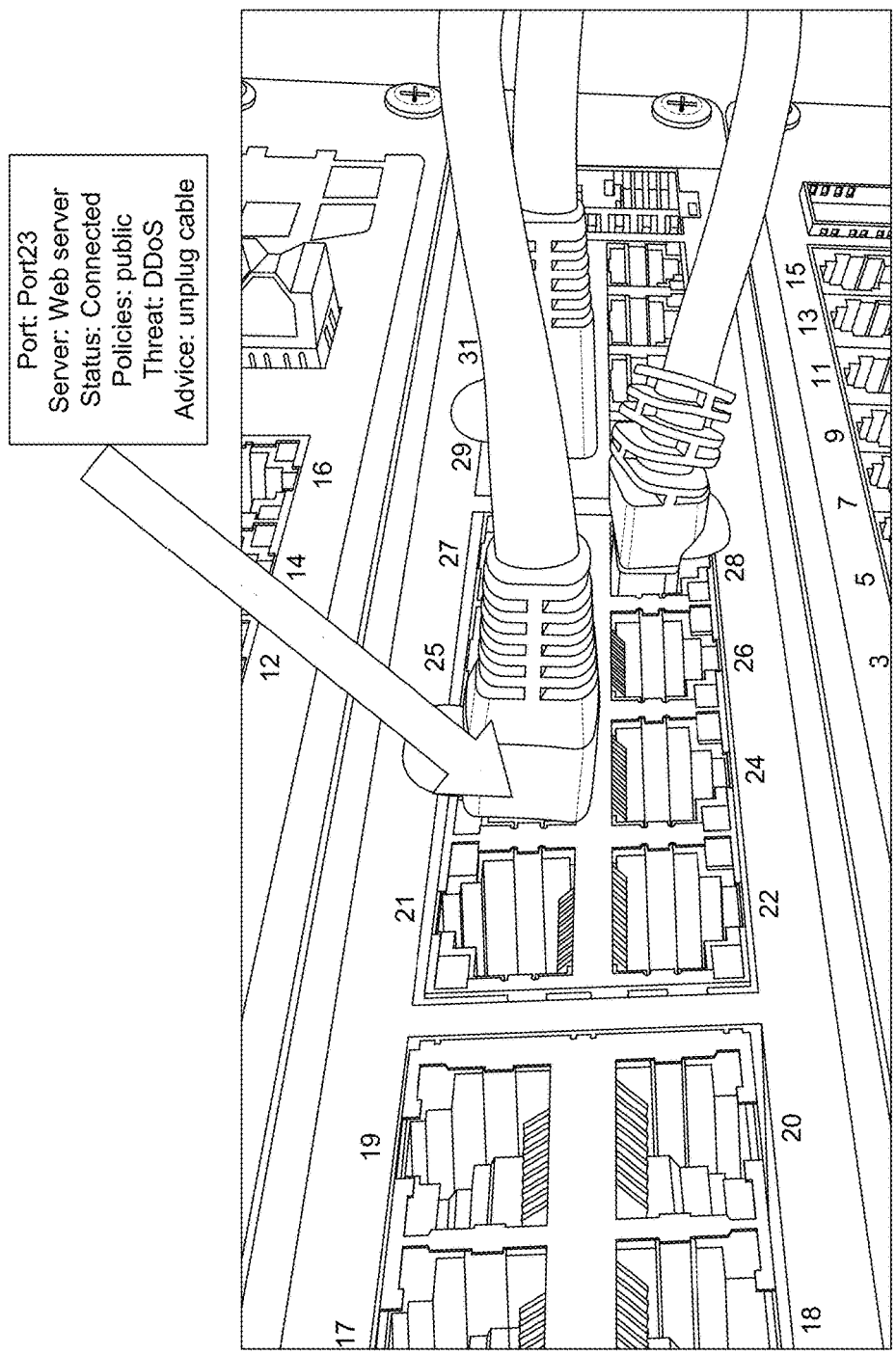
FIG. 2 illustrates an exemplary augmented overlay image in accordance with an embodiment of the present invention.

FIG. 2 illustrates an exemplary augmented overlay image that may be shown on augmented reality device 100. In FIG. 2, the user of augmented reality device aim at a port of a firewall or a cable connected to a port of a firewall and the port/cable may be identified. Dynamic network security information of the port/cable may be retrieved from the firewall and displayed on top of the port/cable. For example, the following information tag with suggested operation may be overlaid on top of the port/cable:

Port: Port23
Server: Web server (10.20.30.40)
Status: Connected
Policies: public
Threat: DDoS attacking Web server (10.20.3.40)
Advice: unplug cable The user may then perform a manual operation with respect to the network cable as directed by or shown in the augmented image.

Figure 3:
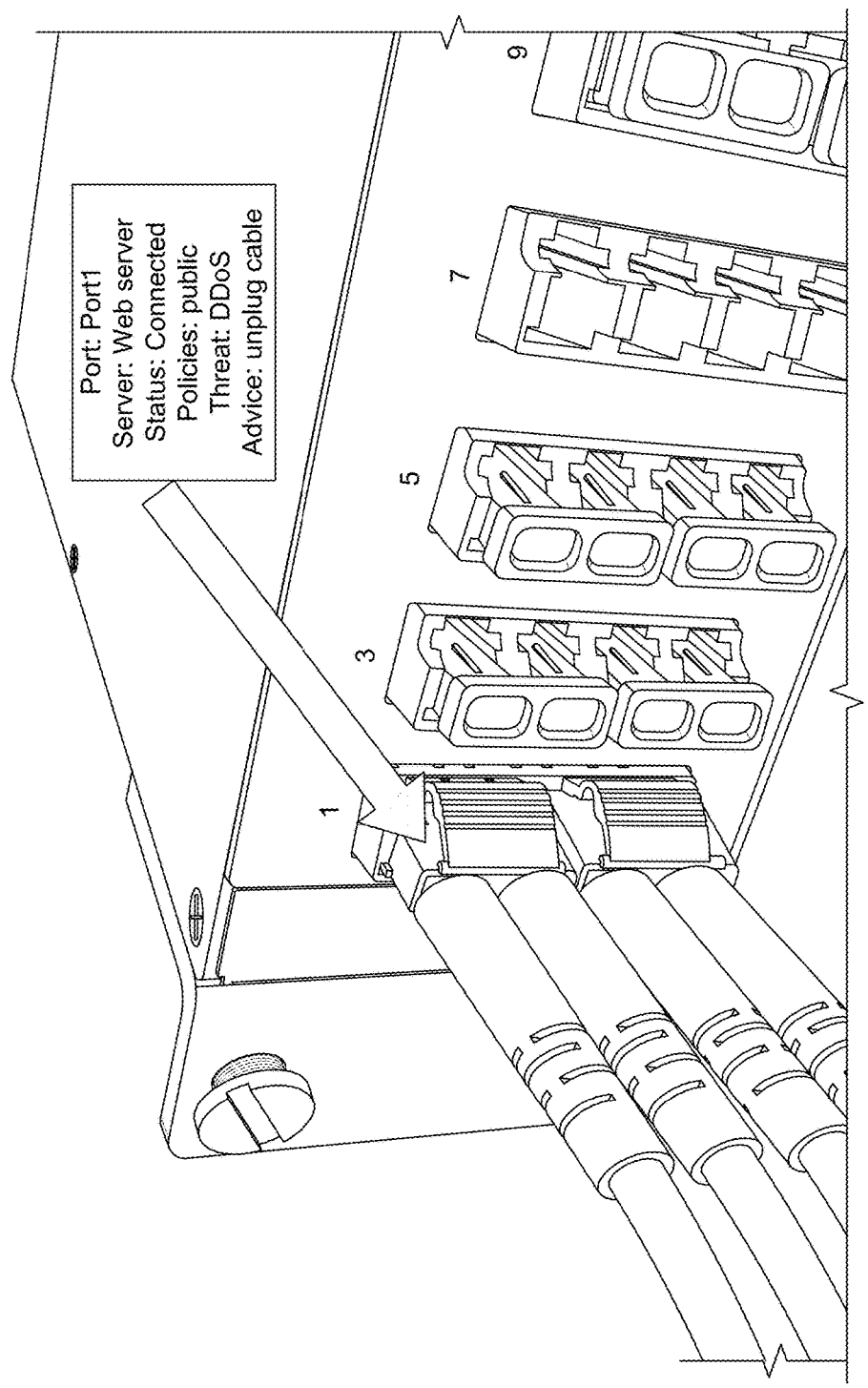
FIG. 3 illustrates an exemplary augmented overlay image in accordance with another embodiment of the present invention.

FIG. 3 illustrates an exemplary augmented overlay image in accordance with another embodiment of the present invention. In this example, multiple cables connected to a firewall are identified. If the firewall detects that a server connected to the cable of port 1 is under attack, the dynamic network security information of the cable of port 1 may be returned to the augmented reality device. The cable may then be highlighted and dynamic network security information may be displayed on the augmented overlay image.

Figure 4:
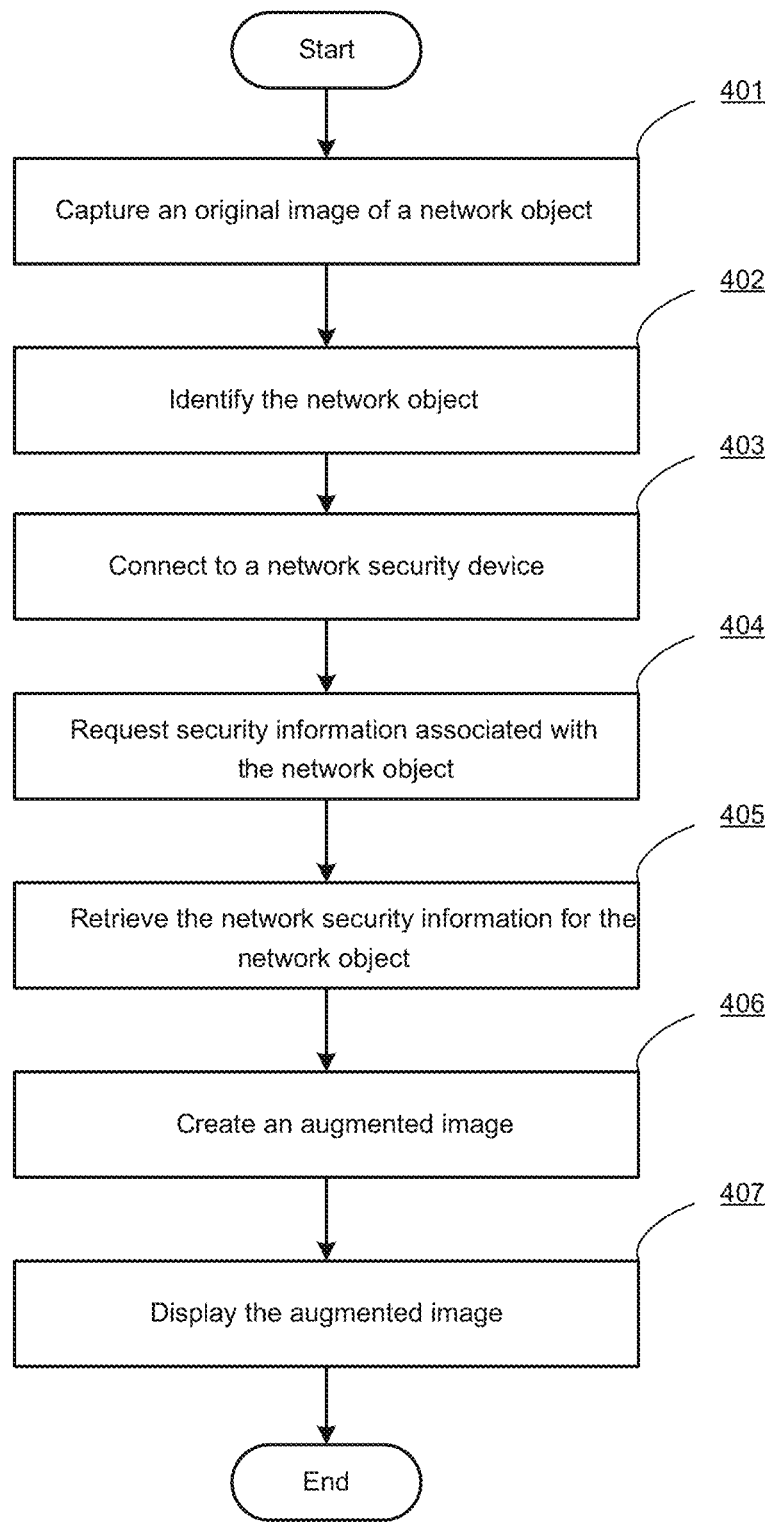
FIG. 4 is a flow diagram illustrating a method for displaying an augmented overlay image of a network object in accordance with an embodiment of the present invention.

FIG. 4 is a flow diagram illustrating a method for displaying an augmented overlay image of a network object in accordance with an embodiment of the present invention.

At block 401, an augmented reality device captures an original image of a network object. The augmented reality device may be a smart glass, a smart phone or other mobile devices that are capable of capturing live image/video by a camera and displaying an augmented image which is a mixture of the original image and overlaid virtual objects. The network object may be a network device as a whole, such as a firewall, a router, a hub, a personal computer and a server, or one or more parts of a network device, such as a network port, a USB port, a cable, a display and a keyboard. The network object may be a network security appliance that manages operations and network traffic of other network devices or a network device that is managed by a network security appliance.

At block 402, the augmented reality device may identify the network object from the original image. In some examples, the network object may be identified through the use of one or more auxiliary tools, e.g., bar codes, QR codes or OCR. In some other examples, the network object may be identified from the captured image or video based on optical object recognition techniques. The user may also select which network object should be identified through eye tracking, vocal command or manual operations through keyboards, buttons or trackpads.

At block 403, the augmented reality device may connect to a network security appliance that is managing the operation or traffic of the identified network object. In one example, the augmented reality device may connect to the network security appliance through peer-to-peer communication. The augmented reality device may pair with the network security appliance through a Bluetooth module to setup a communication link. In another example, the augmented reality device may connect to the network security appliance through network communication, such as a WLAN, 3G/4G/LTE communication module. The user of augmented reality device may be authenticated and a VPN tunnel may be established if the network communication is going through a public network. It is understandable for those skilled in the art that the network security appliance may be the identified network object itself in some examples.

At block 404, the augmented reality device may send the identification of the network object to a network security appliance and retrieve current network security information associated with the network object. The identification of network object may be the MAC address, serial number of the network object or other information that can uniquely identify a network object, e.g., a port number of a particular network security appliance. The network security appliance may determine the network object associated with the identification from an inventory database and determine whether the network object is managed by the network security appliance. If the network object is managed by the network security appliance, dynamic network security information associated with the network object may be returned to the augmented reality device by the network security appliance. For example, security rules controlling the network object may be retrieved from a rule set of the network security appliance. A traffic log associated with the network object may be retrieved from a log system of the network security appliance. If a security event of the network object is detected by the network security appliance, a warning message of the network security event may be sent to the augmented reality device. Non-limiting examples of security events include, a Distributed Denial of Service (DDoS) attack, a system intrusion, data leakage, malware/virus detections or any other threats that can be detected by the security engine of the network security appliance.

At block 405, the augmented reality device retrieves dynamic network security information of the network object from the network security appliance.

At block 406, the augmented reality device creates an augmented image for the dynamic network security information. A virtual tag showing the dynamic network security information of the network object may be generated by the augmented reality device.

At block 407, the augmented image is displayed by the augmented reality device. For an optical head-mounted display, the virtual tag of the dynamic network security information may be projected to the user's eye or a partially reflective/partially transparent screen. For a display panel, the dynamic network security information may be mixed with the reality image of the network object and then the mixed image may be presented on the display panel.

Although a single network object is recognized by the augmented reality device in the above example, those skilled in the art will appreciate that multiple network objects or multiple parts of a network device may be recognized by the augmented reality device. Dynamic network security information of the multiple network objects may be retrieved and an augmented overlay image of these network objects may be displayed. In other examples, the network objects that are under attack or conducting harmful operations to the network may be highlighted in the augmented overlay image and suggested operations relating to the network objects may be displayed on the augmented reality device.

In some examples, the network object can be recognized by the augmented reality device in a standalone mode without help from a connected network security appliance. The augmented reality device may identify a network object by optical object recognition techniques as described above with reference to FIG. 1.

Figure 5:
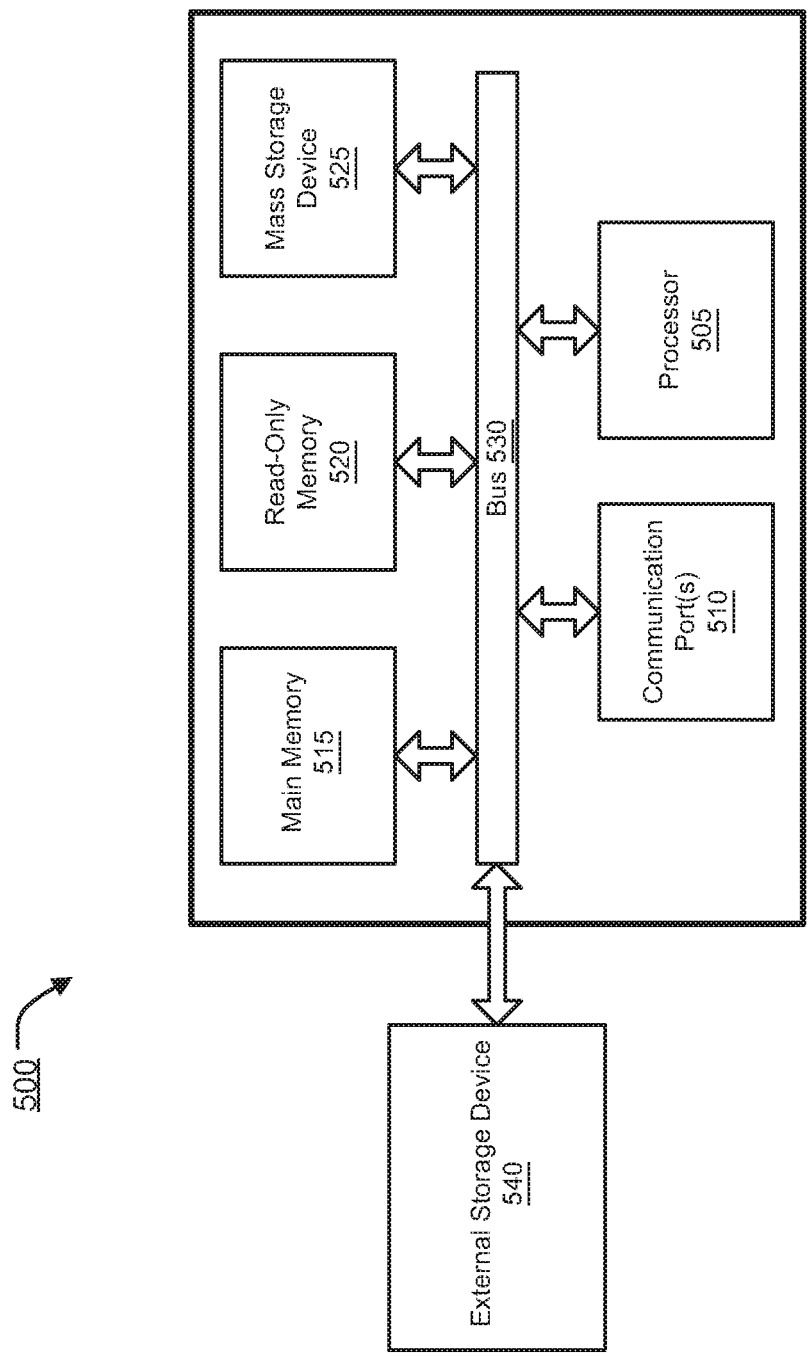
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of an augmented reality device (e.g., augmented reality device 100) a network appliance, a server or a client workstation. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   capturing, by an augmented reality device, a reality image of a network object associated with a private network;
   identifying, by the augmented reality device, the network object from the reality image;

retrieving, by the augmented reality device, dynamic network security information, including (i) a network security event associated with the network object and (ii) a suggestion for mitigating the network security event, from a network security appliance protecting the private network, wherein the suggestion comprises performance of a manual operation with respect to the network object;

generating, by the augmented reality device, an augmented overlay image based on the reality image and the dynamic network security information; and facilitating management of the network security event by a user of the augmented reality device by displaying, by the augmented reality device, the augmented overlay image on the augmented reality device.

2. The method of claim 1, wherein the dynamic network security information further includes:
network policies enforced on the network object;
network traffic going through the network object;
network sessions going through the network object; and
applications running on the network object.

3. The method of claim 1, wherein the network security event comprises one or more of:
detection of a denial of service (DoS) attack;
detection of an intrusion;
detection of malware in network traffic associated with the network object; and
detection of sensitive information being leaked within the network traffic.

4. The method of claim 1, further comprising:
capturing, by the augmented reality device, a current location of the augmented reality device;
sending, by the augmented reality device, the current location of the augmented reality device to the network security appliance; and
retrieving, by the augmented reality device, dynamic network security information of network objects located at the current location of the augmented reality device.

5. The method of claim 1, wherein the augmented reality device comprises: a smart phone, a tablet computer, a network-controlled camera, an optical head-mounted display or a heads-up display.

6. The method of claim 1, wherein the network object is a complete network device or a component of a complete network device that is connected to the private network.

7. The method of claim 6, wherein the network object comprises one or more of a network cable, a port, a network interface, a personal computer, a laptop computer, a server, a networked camera, and an access point.

8. An augmented reality device comprising:
a non-transitory storage device having embodied therein instructions representing a augmented reality application; and
one or more processors coupled to the non-transitory storage device and operable to execute the augmented reality application to perform a method comprising:
capturing a reality image of a network object associated with a private network;
identifying the network object from the reality image;
retrieving dynamic network security information, including (i) a network security event associated with the network object and (ii) a suggestion for mitigating the network security event, associated with the network object from a network security appliance protecting the private network, wherein the suggestion comprises performance of a manual operation with respect to the network object;
generating an augmented overlay image based on the reality image and the dynamic network security information; and
facilitating management of the network security event by a user of the augmented reality device by displaying the augmented overlay image to the user.

9. The augmented reality device of claim 8, wherein the dynamic network security information further includes:
network policies enforced on the network object;
network traffic going through the network object;
network sessions going through the network object; and
applications running on the network object.

10. The augmented reality device of claim 8, wherein the network security event comprises one or more of:
detection of a denial of service (DoS) attack;
detection of an intrusion;
detection of malware in network traffic associated with the network object; and
detection of sensitive information being leaked within the network traffic.

11. The augmented reality device of claim 8, wherein the method further comprises:
capturing a current location of the augmented reality device;
sending the current location of the augmented reality device to the network security appliance; and
retrieving dynamic network security information of network objects located at the current location of the augmented reality device.

12. The augmented reality device of claim 8, wherein the augmented reality device comprises: a smart phone, a tablet computer, a network-controlled camera, an optical head-mounted display or a heads-up display.

13. The augmented reality device of claim 8, wherein the network object is a complete network device or a component of a complete network device that is connected to the private network.

14. The augmented reality device of claim 13, wherein the network object comprises one or more of a network cable, a port, a network interface, a personal computer, a laptop computer, a server, a networked camera, and an access point.

15. The method of claim 1, wherein the augmented reality device comprises smart glasses.

16. The method of claim 6, wherein the network object comprises a network firewall.

17. The method of claim 6, wherein the network object comprises a unified threat management appliance.

18. The augmented reality device of claim 8, wherein the augmented reality device comprises smart glasses.

19. The augmented reality device of claim 13, wherein the network object comprises a network firewall.

20. The augmented reality device of claim 13, wherein the network object comprises a unified threat management appliance.

21. The method of claim 3, wherein the network object comprises a cable connected to a port of a network device and wherein the manual operation comprises disconnection of the cable from the port.

22. The method of claim 21, wherein the network device comprises a router, a switch, a server, a unified threat management device or a network firewall.

23. The augmented reality device of claim 10, wherein the network object comprises a cable connected to a port of a network device and wherein the manual operation comprises disconnection of the cable from the port.

24. The augmented reality device of claim 23, wherein the network device comprises a router, a switch, a server a unified threat management device or a network firewall.

\* \* \* \* \*